US011821460B2

(12) United States Patent
Hackfort et al.

(10) Patent No.: US 11,821,460 B2
(45) Date of Patent: Nov. 21, 2023

(54) ROLLER ARRANGEMENT

(71) Applicant: MATTHEWS INTERNATIONAL GMBH, Vreden (DE)

(72) Inventors: Thomas Hackfort, Ahaus-Altstätte (DE); Frank Bogenstahl, Ahaus (DE); Christoph Lansing, Vreden (DE); René Wolters, Stadtlohn (DE); Harald Bartsch, Dorsten (DE); Carsten Kleingries, Vreden (DE); Kay Wolters, Stadtlohn (DE); Jörg Gottszky, Vreden (DE)

(73) Assignee: MATTHEWS INTERNATIONAL CORPORATION, Pittsburgh, PA (US)

( * ) Notice: Subject to any disclaimer, the term of this patent is extended or adjusted under 35 U.S.C. 154(b) by 0 days.

(21) Appl. No.: 17/786,591

(22) PCT Filed: Nov. 30, 2020

(86) PCT No.: PCT/DE2020/101009
§ 371 (c)(1),
(2) Date: Jun. 17, 2022

(87) PCT Pub. No.: WO2021/121470
PCT Pub. Date: Jun. 24, 2021

(65) Prior Publication Data
US 2023/0009511 A1 Jan. 12, 2023

(30) Foreign Application Priority Data
Dec. 20, 2019 (DE) ...................... 10 2019 135 524.9

(51) Int. Cl.
*F16C 13/02* (2006.01)
*B02C 15/12* (2006.01)

(52) U.S. Cl.
CPC .............. *F16C 13/02* (2013.01); *B02C 15/12* (2013.01); *F16C 2320/23* (2013.01); *F16C 2322/12* (2013.01)

(58) Field of Classification Search
CPC ....................................................... F16C 13/02
See application file for complete search history.

(56) References Cited

U.S. PATENT DOCUMENTS

| 3,416,435 A | * | 12/1968 | Dahl | ....................... F16C 13/00 492/54 |
| 5,038,591 A | * | 8/1991 | Tajima | .................... B21B 31/22 72/13.4 |

(Continued)

FOREIGN PATENT DOCUMENTS

| CN | 101322979 B | 9/2011 |
| CN | 202539193 U | 11/2012 |

(Continued)

OTHER PUBLICATIONS

English Machine Translation of DE102005044957A1 (Year: 2007).*

(Continued)

*Primary Examiner* — Sarang Afzali
(74) *Attorney, Agent, or Firm* — Harness, Dickey & Pierce, P.L.C.

(57) ABSTRACT

A roller arrangement includes at least three parallel-axis rollers with a respective nip formed between adjacent rollers. Each of the rollers having a journal at both axial ends and is pivot-mounted via the respective roller journals. At least two bearings being arranged axially adjacent to one another at least on both of a first roller journal of a first, second and third adjacent rollers. A compressive stress is generated between an inner bearing on the first roller journal of the first roller and an outer bearing on the first roller journal of the second roller and a tensile stress is generated between an outer bearing on the first roller journal of the first (Continued)

roller and an inner bearing on the first roller journal of the second roller or vice versa. Similarly, compressive and tensile stresses are generated between the bearings on respective journals of the second and third adjacent rollers.

14 Claims, 7 Drawing Sheets

(56) References Cited

U.S. PATENT DOCUMENTS

| | | | | |
|---|---|---|---|---|
| 9,156,071 | B2* | 10/2015 | Hackfort | ................. B21B 37/64 |
| 2013/0228082 | A1* | 9/2013 | Honjou | ............... H01M 4/0435 |
| | | | | 492/2 |
| 2014/0109642 | A1 | 4/2014 | Hackfort et al. | |

FOREIGN PATENT DOCUMENTS

| | | | | |
|---|---|---|---|---|
| CN | 202963033 | U | 6/2013 | |
| DE | 3338625 | A1 | 5/1985 | |
| DE | 4418549 | A1 | 12/1994 | |
| DE | 19815339 | A1 | 10/1999 | |
| DE | 10000231 | A1 | 7/2001 | |
| DE | 102005044957 | A1 * | 3/2007 | ............. B65H 27/00 |
| DE | 102011018874 | B3 | 8/2012 | |
| DE | 202014104438 | U1 | 9/2014 | |
| EP | 1114890 | A2 | 7/2001 | |

OTHER PUBLICATIONS

International Search Report (English and German) and Written Opinion (German) issued in PCT/DE2020/101009, dated Mar. 25, 2021; ISA/EP.

* cited by examiner

ROLLER ARRANGEMENT

CROSS-REFERENCE TO RELATED APPLICATIONS

This application is a U.S. National Phase Application under 35 U.S.C. 371 of International Application No. PCT/DE2020/101009, filed on Nov. 30, 2020, which claims the benefit of German Patent Application No. 10 2019 135 524.9, filed on Dec. 20, 2019. The entire disclosures of the above applications are incorporated herein by reference.

BACKGROUND

This section provides background information related to the present disclosure which is not necessarily prior art.

Technical Field

The invention relates to a roller arrangement having at least two rollers arranged axially parallel, a respective nip being formed between adjacent rollers, each of the rollers having a roller journal at each of its two axial ends and each roller being mounted via its two roller journals, at least two bearings being arranged axially adjacent to one another at least on a first roller journal of a first of the rollers and an adjacent first roller journal of a second of the rollers.

Discussion

In a roller mill, the rollers are set in position relative to each other via bearings in the chocks. The distance between the rollers can be adjusted by advancing at least one of the rollers. When processing conventional materials with homogeneous material properties, the rollers are pressed against each other by the more or less constant direction of force flow through the rolled material into the opposite reveal of the bearings and remain there. This does not pose a problem for the processing quality as long as the force directions are more or less constant and the pressure in the nip and the associated infeed remain reasonably constant. For the majority of rolling processes, this infeed is sufficiently accurate because there are no major load changes.

Roller mills of this conventional type, on the other hand, are not suitable for processing materials which, in the course of continuous production, develop different material properties as a result of the rolling process and in the course of this process, thus causing different process forces in the nip. A different density distribution in a material web to be produced results in different rolling forces, which cause the nip to collapse or the rollers to be pressed apart. This results in different material thicknesses and different properties of the later finished rolled material as a material web, film, coated material web or multilayer material web.

Particularly in the case of a roller arrangement with more than two rollers in a line and continuous meandering passage of the rolled stock through the individual nips one after the other, the problem arises of alternately preloading the side of the bearing facing the load without play and, on the other hand, getting the face side facing away from the nip into contact in order to be able to apply the load required for rolling in both nips on both sides of the roller.

SUMMARY

This section provides a general summary of the disclosure, and is not a comprehensive disclosure of its full scope or all of its features.

It is therefore one aspect of the present invention to improve a roller arrangement in such a way that it enables improved infeed and at the same time a low bearing clearance is realized.

Accordingly, a roller arrangement with at least two rollers arranged axially parallel is proposed, wherein a respective nip is formed between adjacent rollers, wherein each of the rollers has a roller journal at both of its two axial ends and each roller is mounted via its two roller journals, wherein at least two respective bearings are arranged axially adjacent to one another at least on a first roller journal of a first of the rollers and an adjacent first roller journal of a second of the rollers, wherein a compressive stress is generated between an inner bearing on the first roller journal of the first roller and an outer bearing on the first roller journal of the second roller, and a tensile stress is generated between an outer bearing on the first roller journal of the first roller and an inner bearing on the first roller journal of the second roller, or vice versa. The reverse means that the tensile and/or compressive stresses can also be reversed as long as they exist between diagonally spaced adjacent bearings. By this crosswise tensioning, two roller bearings can be tensioned against each other in series on the roller journals in such a way that a nesting of the force guidance results, so that a necessary clearance is made possible.

In one embodiment, deviating from this, it may be provided that only compressive or tensile stresses are provided at all bearings.

Furthermore, the roller arrangement can have at least three rollers arranged axially parallel, wherein two bearings can be arranged axially adjacent to one another at least on a first roller journal of a third of the rollers, wherein a compressive stress is generated between the inner bearing on the first roller journal of the second roller and an outer bearing on the first roller journal of the third roller and a tensile stress is generated between the outer bearing on the first roller journal of the second roller and an inner bearing on the first roller journal of the third roller, or vice versa. The stress states between diagonally spaced bearings can alternate in particular from roller to roller. This means that the inner bearing of the middle roller can be under tensile stress towards the first roller and under compressive stress towards the third roller or vice versa. Furthermore, this means that the outer bearing of the middle roller can be under compressive stress towards the first roller and under tensile stress towards the third roller or vice versa. In particular, the stresses acting on a bearing on both sides may be equal. It can therefore be envisaged that any number of further rollers with the same bearing configuration are arranged axially parallel next to each other and the stress curves through the bearings continue as described above.

In addition, at least two bearings can be arranged at least on both of a second roller journal of the first roller and an adjacent second roller journal of the second roller, wherein a compressive stress is generated between an inner bearing on the second roller journal of the first roller and an outer bearing on the second roller journal of the second roller mirror inverted to the opposite first roller journal side, and a tensile stress is generated between an outer bearing on the second roller journal of the first roller and an inner bearing on the second roller journal of the second roller, or vice versa. In this context, mirror-inverted means mirrored on a radial center axis running perpendicular to the rollers. In particular, this means that the same tensile or compressive stresses can be applied to both inner and both outer bearings of opposite roller journals.

In addition, at least two bearings can be arranged at least on the second roller journal of the third roller, wherein a compressive stress is generated between an inner bearing on the second roller journal of the second roller and an outer bearing on the second roller journal of the third roller, mirror-inverted to the opposite first roller journal side, and a tensile stress is generated between an outer bearing on the second roller journal of the second roller and an inner bearing on the second roller journal of the third roller, or vice versa.

In particular, it can be provided that at least three bearings are arranged axially adjacent to each other at least at a first roller journal of the first roller and the adjacent first roller journal of the second roller, wherein a compressive stress is generated between, on the one hand, an inner bearing and an outer bearing at the first roller journal of the first roller and, on the other hand, a middle bearing unit at the first roller journal of the second roller, and a tensile stress is generated between, on the one hand, a central bearing unit on the first roller journal of the first roller and, on the other hand, an inner bearing and an outer bearing on the first roller journal of the second roller, or vice versa. This arrangement becomes particularly relevant for high loads where it is necessary to nest the bearings in a multiple arrangement in such a way that the loads in the journals overlap with the load collectives in such a way that the journal bending or the bending moment towards the roller bale transition, i.e. at the roll-side end of the roller bearing directed towards the roller bale, is reduced to zero Nm.

Furthermore, at least three rollers arranged axially parallel can be provided, at least three bearings being arranged axially adjacent to one another at least on the first roller journal of the third roller, a compressive stress being generated between, on the one hand, an inner bearing and an outer bearing on the first roller journal of the second roller and, on the other hand, a central bearing unit on the first roller journal of the third roller, and a tensile stress being generated between, on the one hand, a central bearing unit on the first roller journal of the second roller and, on the other hand, an inner bearing and an outer bearing on the first roller journal of the third roller, or vice versa. The stress states between diagonally spaced bearings can alternate in particular from roller to roller. This means that the inner bearing of the middle roller can be under tensile stress towards the inner and outer bearing of the first roller and under compressive stress towards the inner and outer bearing of the third roller, or vice versa. Further, this means that the inner and outer bearings of the middle roller may be under compressive stress toward the middle bearing of the first roller and under tensile stress toward the middle bearing of the third roller or vice versa. In particular, the stresses acting on a bearing on both sides may be equal. It can therefore be envisaged that any number of further rollers with the same bearing configuration are arranged axially parallel next to each other and the stress curves through the bearings continue as described above.

In addition, at least three bearings can be arranged at least on both of the second roller journal of the first roller and the adjacent second roller journal of the second roller, wherein a compressive stress is generated mirror inverted to the opposite first roller journal side between on the one hand an inner bearing and an outer bearing on the second roller journal of the first roller and on the other hand a middle bearing unit on the second roller journal of the second roller, and a tensile stress is generated between, on the one hand, a central bearing unit on the second roller journal of the first roller and, on the other hand, an inner bearing and an outer bearing on the second roller journal of the second roller, or vice versa. In this context, mirror-inverted means mirrored on a radial center axis running perpendicular to the rollers. Thus, in particular, the same type of tension can be provided on the one hand on both inner and both outer bearings of opposite roller journals and on the other hand on both middle bearings of opposite roller journals. It can also be provided that the individual stress states of directly adjacent bearing sides facing each other are complementary to each other.

In addition, at least three bearings can be arranged at least on the second roller journal of the third roller, a compressive stress being generated mirror inverted to the opposite first roller journal side between, on the one hand, an inner bearing and an outer bearing on the second roller journal of the second roller and, on the other hand, a central bearing unit on the second roller journal of the third roller, and a tensile stress being generated between, on the one hand, a central bearing unit on the second roller journal of the second roller and, on the other hand, an inner bearing and an outer bearing on the second roller journal of the third roller, or vice versa. By means of such a bearing arrangement and bearing tension, a compression or tension state is generated between opposing roller journals in a crosswise manner, with the pressure curves of similar pressures of adjacent clamps having the same curve. For example, compressive stresses from roller journal to roller journal always run from the outer and inner bearing inwards to the middle bearing unit, while tensile stresses always run from the middle bearing unit outwards to the outer and inner bearing.

It can be provided that a material to be rolled is guided through them alternately in opposite directions from nip to nip. In this way, inner rollers can be used for rolling on both sides. Due to the different direction of rotation of adjacent rollers, it is necessary to guide the material alternately from above and from below through adjacent roller nips.

Furthermore, a roller position control unit can be arranged between the roller journals to generate the tensile and/or compressive stresses, via which the respective nip adjustments are realized.

In this case, the roller bearing control unit can have a pressure-controlled actuator. Preferably, a separate actuator is provided between each coupled bearing pair. A pressure-controlled actuator has the advantage, particularly for materials with inhomogeneous density distribution, that the infeed can be set particularly effectively.

In particular, the actuator may have a hydraulic, mechanical, or electrical actuator. Alternatively, the actuator may have a hydraulic actuator, a mechanical spindle, and a linear motor.

Furthermore, the roller bearing control unit can be operatively connected to the outer rings of the bearings.

In particular, the middle bearing unit can have one or more, preferably two bearings. If the middle bearing unit has two bearings, these can be arranged directly next to each other in the axial direction. Furthermore, adjacent bearings of the middle bearing unit can be axially braced with each other.

In addition, the bearing may include a rolling bearing and/or a sleeve bearing.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Exemplary embodiments of the invention are explained with reference to the following figures. Thereby shows.

DETAILED DESCRIPTION

Example embodiments will now be described more fully with reference to the accompanying drawings.

Figure 1A:
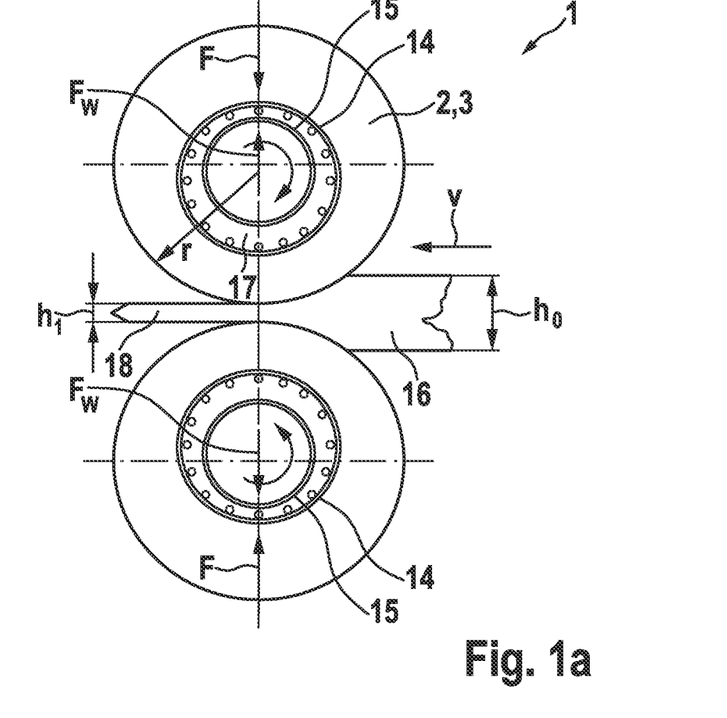
FIG. 1a a cross-sectional view of a roller arrangement showing process forces in the rolling process.

In a roller mill, the rollers are set in position relative to each other via bearings in the chocks. FIG. 1a shows a roller arrangement 1 of a roller mill with two rollers 2, 3 arranged axially parallel to each other, between which a nip of width $h_1$ is formed. In the side view shown, it can be seen that the roller bearing arrangement consists of a bearing inner ring 15 and a bearing outer ring 14, in which the bearing inner ring 15 is rotatably mounted. The bearing outer rings 14 are anchored in the chocks. By passing the material web 16 with a thickness $h_0$ through the nip 5, the material web 16 is reduced to a compacted material web 18 with a material thickness of a height $h_1$. Due to the more or less constant direction of force flow through the material web 16 of the rolled material, the rollers are pressed against each other into the opposite reveal of the bearings and remain there. The resulting process forces exerted perpendicular to the feed-through direction of the material web 16 are the respective force from the rolled material $F_w$ from the bearing inner ring 15 onto the bearing outer ring 14. At the same time, the line force F from the bearing outer rings 14 acts on the bearing inner rings 15. As a result, the bearing inner rings 15 are pressed outward toward the inside of the bearing outer rings 14, so that a respective bearing clearance 17 is on the side of the bearing outer ring 14 facing the rolling gap 5.

Figure 1B:
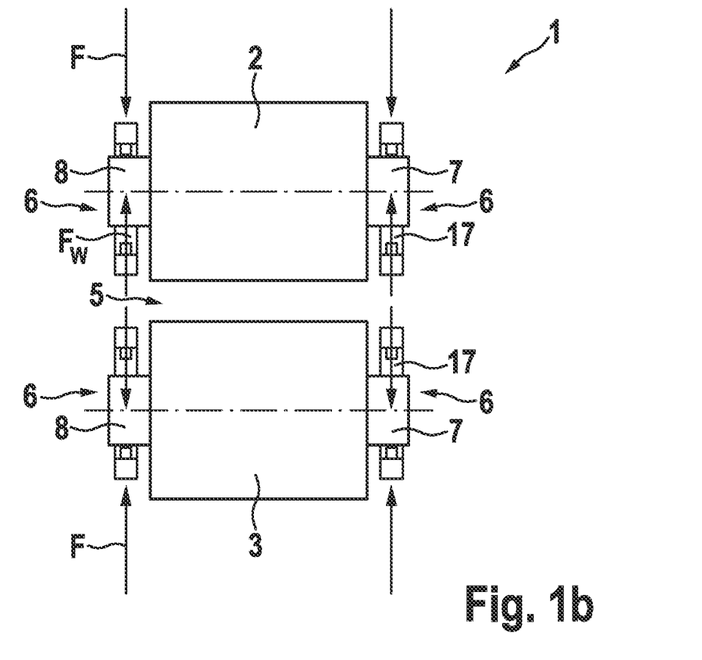
FIG. 1b a schematic view of a prior art roller arrangement showing process forces acting on the bearings in the rolling process.

A representation of the process forces according to FIG. 1a can also be seen in FIG. 1b, which shows a top view of the bearing arrangement from FIG. 1a. Two rollers 2, 3 are arranged axially parallel to each other, forming a nip 5. Each roller 2, 3 has roller journals 7, 8 at its axial ends 6, with a bearing 9 being arranged on each roller journal 7, 8, so that the roller 2, 3 is supported by this bearing arrangement. When a web of material 16 passes through the roller nip 5, process forces are generated perpendicular to the direction of passage, which are transmitted via the roller bales to the roller journals and are each transmitted from the journals to the bearing inner rings 15 arranged thereon, which in turn are supported via the bearing outer rings 14. As a result of these forces $F_w$ from the rolled stock, the bearing inner rings 15 are pressed outward within the bearing outer rings 14, so that a bearing clearance 17 is created on the inside of each bearing. In addition, the line force F from the infeed in the direction of the roller nip 5 is exerted on the bearing outer rings 14 by the infeed of the bearings to each other, i.e. by adjusting the width of the rolling gap 5.

Figure 2:
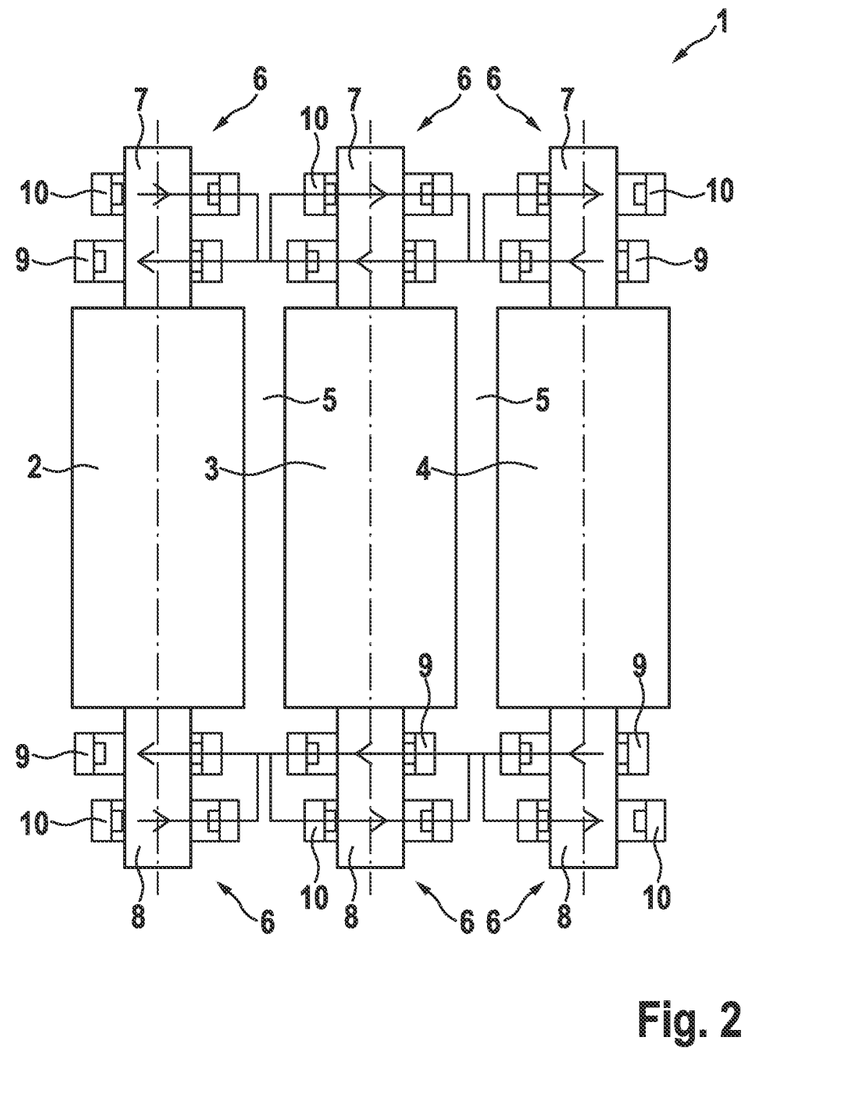
FIG. 2 a schematic view of an embodiment of a roller arrangement according to the invention.
Figure 3:
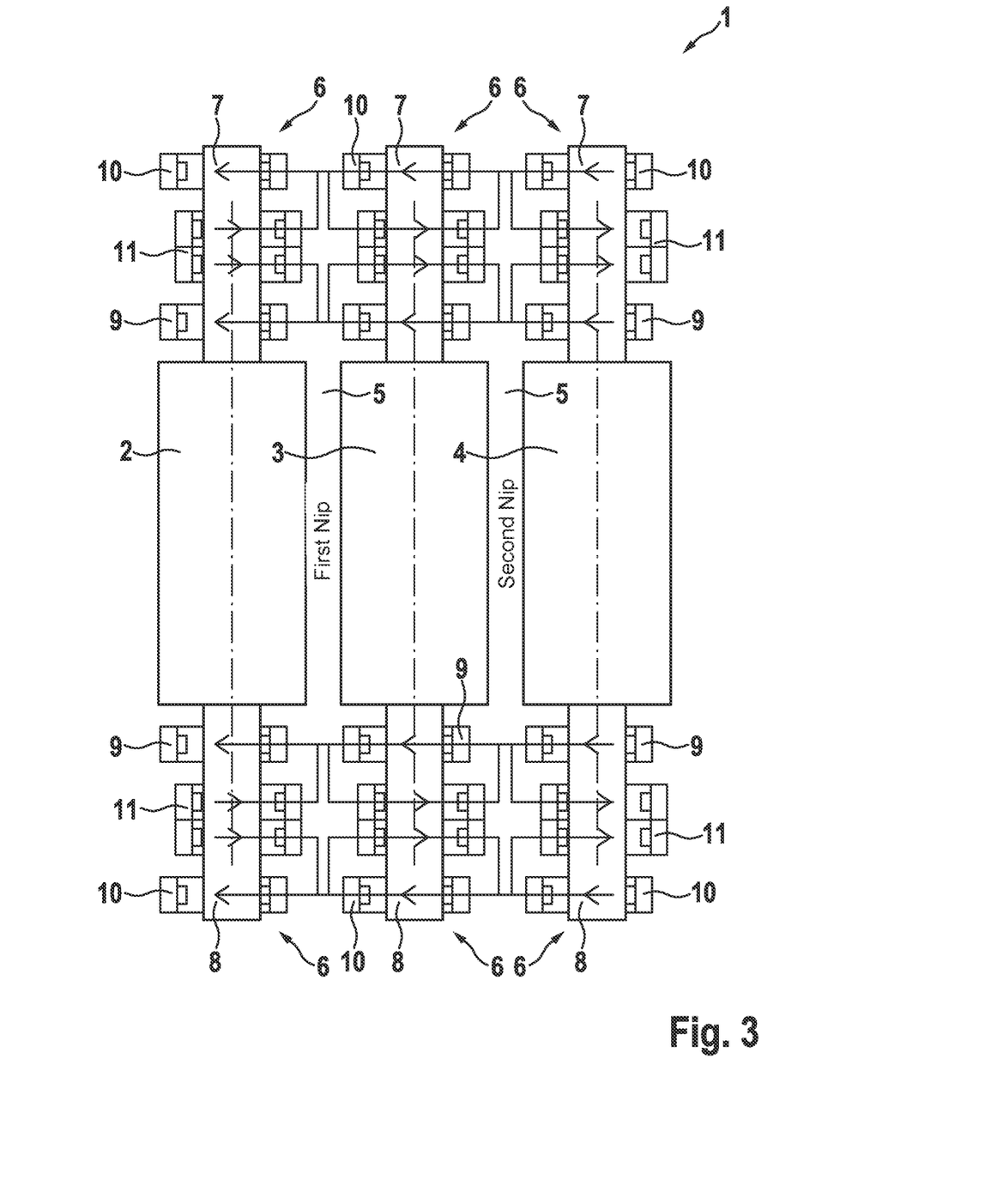
FIG. 3 a schematic view of a further embodiment of an inventive roller arrangement.

The design examples according to the invention shown in FIGS. 2 and 3 have the advantage, particularly in the case of large load changes caused by the rolled stock, of being able to react to the load changes independently with micrometer accuracy from roller nip 5 to roller nip 5 by means of the roller position control provided and at the same time eliminating the bearing clearances. With the arrangement 1 of the roller bearings to each other described in the invention, it is possible to arrange the chocks with the force application as well as the gap feeds to be opposed thereto in a nesting, which are each arranged in a cascade. In a first embodiment according to FIG. 2, two roller bearings can be provided for each roller journal 7, 8 in a row of rollers 2, 3, 4 arranged axially parallel and clamped against each other in such a way that nesting of the force guidance results so that the necessary clearance-free position is made possible. In the example shown, the bearing outer rings 14 of diagonally adjacent bearings are in an operative connection that generates either tensile or compressive stress between the bearings. For example, the bearing outer ring 15 of the outer bearing 10 on the first roller journal 7 of the first roller 2 is under tensile stress with the diagonally adjacent bearing outer ring 15 of the inner bearing 9 on the first roller journal 7 of the second roller 3. Furthermore, a compressive stress exists between the side of the bearing outer ring 15 of bearing 9 on the first roller journal 7 of the second roller 3 facing away from the first roller 2 and the diagonally adjacent bearing outer ring 15 of the outer bearing 10 on the first roller journal 7 of the third roller 4. At the same time, there is an effective connection between the bearing outer ring 15 of the inner bearing 9 on the first roller journal 7 of the first roller 2 and the bearing outer ring 15 of the outer bearing 10 on the first roller journal 7 of the second roller 3 in the form of a compressive stress. The side of the bearing outer ring 15 of the outer bearing 10 on the first roller journal 7 of the second roller 3 facing away from the first roller 2 is in turn in operative connection with the diagonally adjacent bearing outer ring 15 of the inner bearing 9 on the first roller journal 7 of the third roller 4 in the form of a tensile stress. Thus, the tensile or compressive stresses always alternate in a zigzag pattern in the course of the series of bearings in operative connection with one another. Thus, in the example shown in FIG. 2, the tensile stresses on the side of the first roller journal 7 always run from the outer bearing 10 of the left roller to the inner bearing 9 of the adjacent roller on the right. Conversely, the compressive stresses on the side of the first roller journals 7 always run from the inner bearing 9 of the left roller to the outer bearing 10 of the adjacent roller on the right. The stress curves on the side of the second roller journal 8 are exactly mirror images of those on the first side of the roller journal 7. In the example shown in FIG. 2, the compressive stresses always run from the inner bearing 9 of the left roller to the outer bearing 10 of the adjacent roller on the right. Conversely, the tensile stresses always run from the left bearing 10 of the left roller to the inner bearing 9 of the adjacent roller on the right. This bearing arrangement with the corresponding stress curves can be continued over any number of rollers arranged axially parallel to one another with nips 5 formed between them.

The embodiment example in FIG. 3 shows a further embodiment example of a roller arrangement 1, in which four bearings 9, 10, 11 are arranged axially adjacent to each other on a first roller journal 7 of the first roller 2 and the adjacent first roller journal 7 of the second roller 3. In this case, the middle two bearings 11 form a bearing unit in which both bearings 11 are arranged directly next to one another and are braced against one another. In contrast, the two outer bearings 9 and 10 are each arranged at a distance from the middle bearing unit. A compressive stress is generated between, on the one hand, the inner bearing 9 and the outer bearing 10 on the first roller journal 7 of the first roller 2 and, on the other hand, the middle bearing unit on the first roller journal 7 of the second roller 3. Furthermore, a tensile stress is generated between, on the one hand, the middle bearing unit on the first roller journal 7 of the first roller 2 and, on the other hand, the inner bearing 9 and the outer bearing 10 on the first roller journal 7 of the second roller 3. This arrangement 1 becomes particularly relevant for high loads where it is necessary to nest the bearings 9, 10, 11 in a multiple arrangement in such a way that the loads in the journals 7, 8 overlap with the load collectives in such a way that the journal bending or the bending moment towards the roller bale transition, i.e. at the roll-side end of the roller bearing directed towards the roller bale, is reduced to zero Nm. FIG. 3 further shows a roller arrangement 1 comprising three rollers 2, 3, 4 arranged axially parallel, four bearings 9, 10, 11 likewise being arranged axially adjacent to one another on the first roller journal 7 of the third roller 4, a compressive stress being generated between, on the one hand, the inner bearing 9 and the outer bearing 10 on the first roller journal 7 of the second roller 3 and, on the other hand, the middle bearing unit on the first roller journal 7 of the third roller 4, and a tensile stress is generated between, on the one hand, the middle bearing unit on the first roller journal 7 of the second roller 3 and, on the other hand, the inner bearing 9 and the outer bearing 10 on the first roller journal 7 of the third roller 4. In addition, four bearings 9, 10, 11 are respectively arranged on the second roller journal 8 of the first roller 2 and on the adjacent second roller journal 8 of the second roller 3, a compressive stress being generated mirror inverted to the opposite first roller journal 7 between, on the one hand, the inner bearing 9 and the outer bearing 10 on the second roller journal 8 of the first roller 2 and, on the other hand, the middle bearing unit on the second roller journal 8 of the second roller 3, and a tensile stress is generated between, on the one hand, the middle bearing unit on the second roller journal 8 of the first roller 2 and, on the other hand, the inner bearing 9 and the outer bearing 10 on the second roller journal 8 of the second roller 3. In addition, four bearings are also arranged on the second roller journal 8 of the third roller 4, whereby a compressive stress is generated between the inner bearing 9 and the outer bearing 10 on the second roller journal 8 of the second roller 3 and, on the other hand, a middle bearing unit on the second roller journal 8 of the third roller 4 mirror inverted to the opposite first roller journal side 7, and a tensile stress is generated between, on the one hand, the central bearing unit 11 on the second roller journal 8 of the second roller 3 and, on the other hand, the inner bearing 9 and the outer bearing 10 on the second roller journal 8 of the third roller 4.

Figure 4:
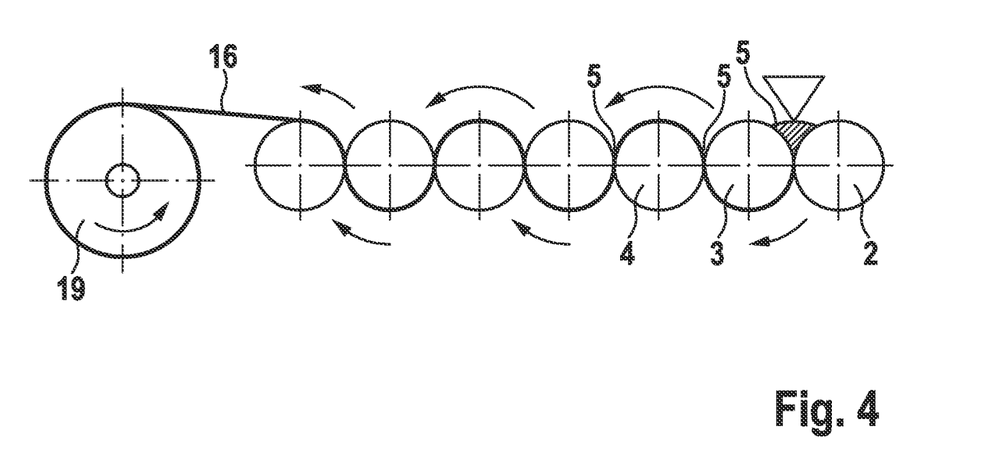
FIG. 4 a cross-sectional view of an exemplary roller arrangement with a plurality of rollers arranged in series.

FIG. 4 shows a roller arrangement 1 with seven rollers in a line, in which the inner five rollers form roller nips 5 with the respective adjacent rollers at the front and rear. The finished rolled material web 16 is wound onto a take-up reel 19 after passing through all roller nips 5. Due to the requirement in such roller arrangements 1 to provide the necessary infeed in both roller nips 5 of the rollers concerned, the invention is of particular advantage especially for such roller arrangements 1 with more than two rollers. In such arrangements 1, the problem arises of alternately preloading the side of the bearing facing the load without play and at the same time getting the side of the shell facing away from the nip 5 into contact in order to be able to apply the load required for rolling in the nip.

Figure 5A:
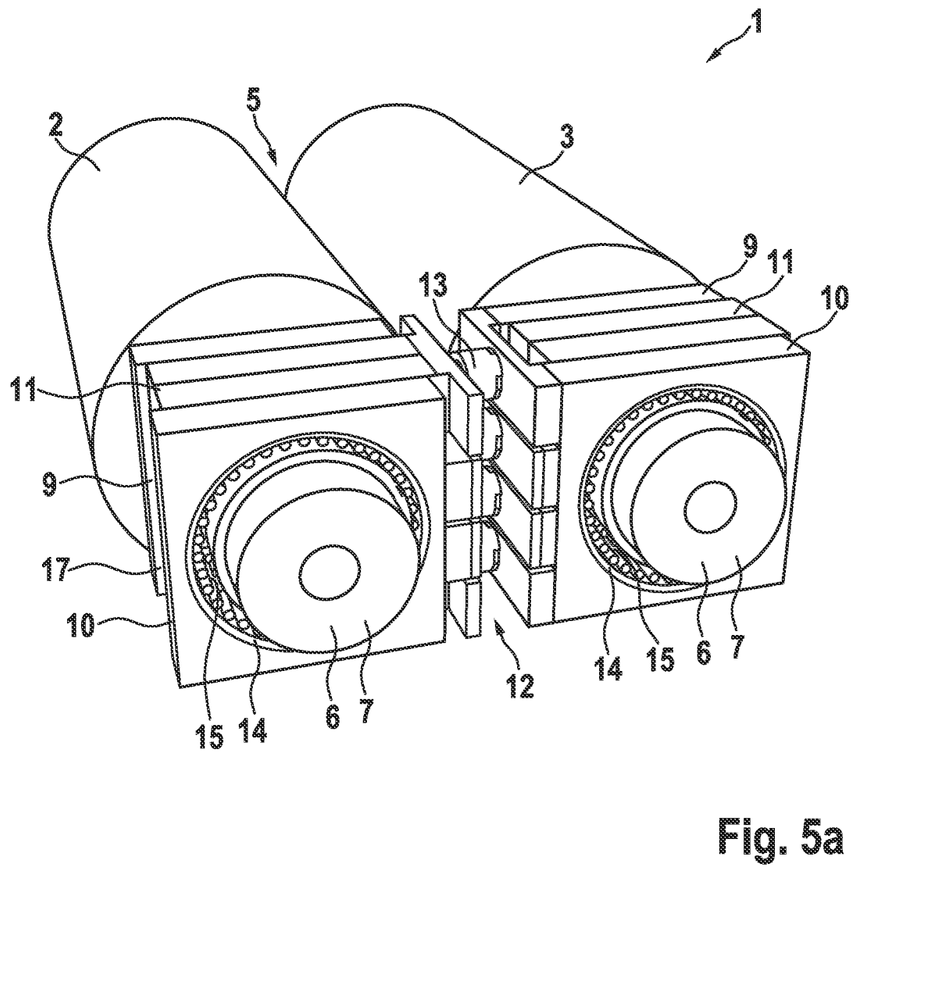
FIG. 5a a side view of an example of a roller arrangement according to the invention with four bearings per roller journal.
Figure 5B:
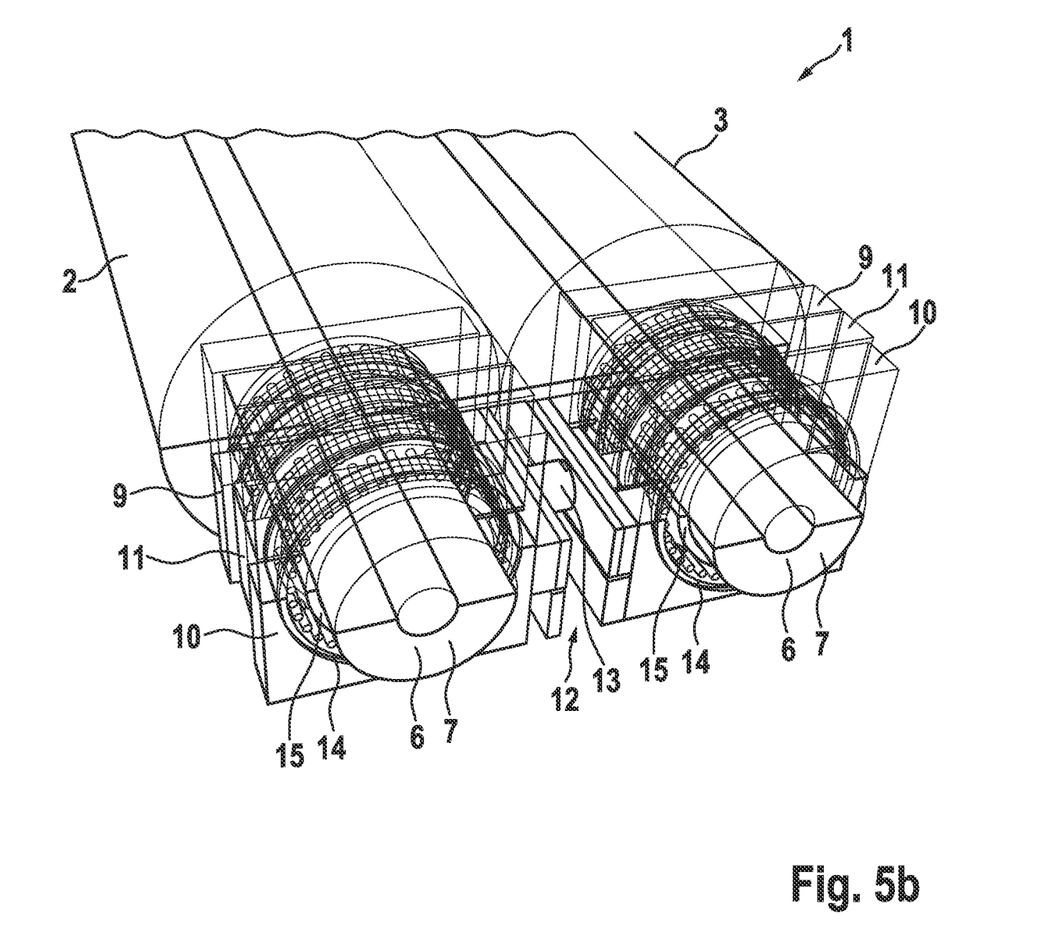
FIG. 5b a semitransparent side view of an example of a roller arrangement according to the invention with four bearings per roller journal.

FIGS. 5*a* and 5*b* each show side views of an embodiment of a roller arrangement 1 according to the invention with four bearings 9, 10, 11 per roller journal 7, 8, in particular showing how the individual bearings 9, 10, 11 are braced against each other. Each of the rollers 2, 3 shown here has four bearings 9, 10, 11 on the roller journal 7 shown, which are adjusted relative to one another under defined preloads by means of a roller bearing control unit 12 arranged between the roller journals 7 of both rollers 7, 8. The bearings are nested next to each other on both journals 7 vertically in the axial direction of the rollers 2, 3. It can be seen that the roller bearing control unit 12 has four actuators 13, which are arranged one above the other. In the example shown, the uppermost and the lowermost actuator 13 generate a tensile stress which acts on the middle bearings 11 of the left roller 2 and the inner and outer bearings of the right roller 3. In contrast, the middle two actuators 13 each exert a compressive stress on the inner and outer bearings 9, 10 of the left roller 2 and on the middle bearings 11 of the right roller 3. The stresses are transmitted via pressure transmission elements which are coupled on both sides of the actuator to the corresponding bearing outer rings 14 of the actuated bearings. The pressure transmission elements are arranged horizontally one below the other and form a drawer structure. It can be seen that the bearing inner ring 15 of the front-side outer bearing 10 of the left roller 2, which is under compressive stress, bears against the rolling elements of the bearing outer ring 14 towards the nip 5 and that there is bearing play on the side facing away from the nip 5. Similarly, it can be seen that the bearing inner ring 15 of the front-side outer bearing 10 of the right roller 3, which is under tensile stress, bears against the rolling elements of the bearing outer ring 14 on the side facing away from the nip 5 and that there is bearing play on the side facing the nip 5. Via the roller bearing control unit, it is possible to vary the individual tensile and compressive forces of the individual actuators and, in particular, to control them via the pressures prevailing in the various roller nips 5. It is further possible to interchange the pressure configuration so that the bearings under tensile stress are transferred to a compressive stress and those under a compressive stress are transferred to a tensile stress condition. In the embodiment shown, the bearings are cylindrical roller bearings.

Figure 6:
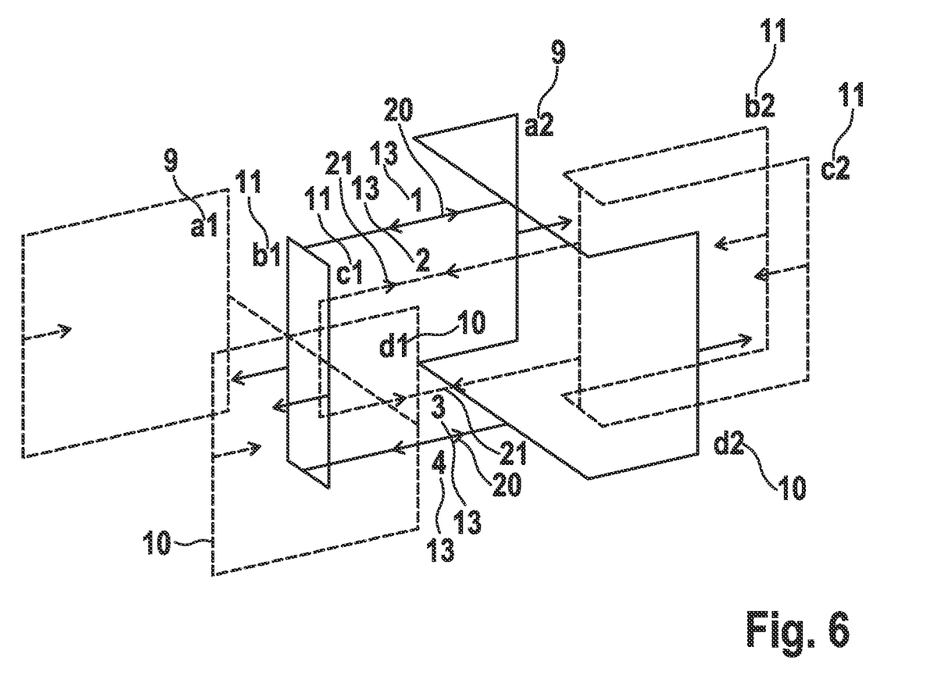
FIG. 6 a view of a polygon of forces of an embodiment of a roller arrangement according to the invention with four bearings per roller journal.

FIG. 6 shows a force flow diagram of roller journal to roller journal using the example of a quadruple bearing arrangement. In this exemplary design, the dashed highlighted frame realizes the infeed of the two adjacent rollers 2, 3 to each other. The bearings marked a1, d1, b2 and c2 in the illustration are fed in a pressure-controlled manner by two actuators marked with the numbers 13-2 and 13-3. At the same time, the bearings marked b1, c1, a2 and d2 are held in position by the actuators marked 13-1 and 13-4. In this way, the respective bearings are preloaded against each other and each other, and the respective rollers are pre-positioned relative to each other. In the same way, the design can be adapted at the positions in a row so that the rollers can be continuously positioned relative to each other to represent the respective subsequent nip.

The features of the invention disclosed in the foregoing description, in the figures as well as in the claims may be essential for the realization of the invention both individually and in any combination.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A roller arrangement comprising at least three rollers arranged axially parallel, wherein a respective nip is formed between adjacent rollers, each of the rollers having a roller journal at both of each roller two axial ends, each roller being pivot-mounted via each roller two roller journals, at least two bearings being arranged axially adjacent to one another at least on all of a first roller journal of a first of the rollers, an adjacent first roller journal of a second of the rollers and an adjacent first roller journal of a third of the rollers,
   wherein a compressive stress is generated between an inner bearing on the first roller journal of the first roller and an outer bearing on the first roller journal of the second roller and a tensile stress is generated between an outer bearing on the first roller journal of the first roller and an inner bearing on the first roller journal of the second roller or vice versa, and
   wherein a compressive stress is generated between the inner bearing on the first roller journal of the second roller and an outer bearing on the first roller journal of the third roller, and wherein a tensile stress is generated between the outer bearing on the first roller journal of the second roller and an inner bearing on the first roller journal of the third roller, or vice versa.

2. The roller arrangement according to claim 1, wherein at least two bearings are arranged on at least a second roller journal of the first roller and on an adjacent second roller journal of the second roller,
   wherein a compressive stress is generated between an inner bearing on the second roller journal of the first roller and an outer bearing on the second roller journal of the second roller mirror inverted to the opposite first roller journal side, and a tensile stress is generated between an outer bearing on the second roller journal of the first roller and an inner bearing on the second roller journal of the second roller, or vice versa.

3. The roller arrangement according to claim 1, wherein at least two bearings are arranged at least on the second roller journal of the third roller, wherein a compressive stress is generated between an inner bearing on the second roller journal of the second roller and an outer bearing on the second roller journal of the third roller mirror inverted to the opposite first roller journal side, and a tensile stress is generated between an outer bearing on the second roller journal of the second roller and an inner bearing on the second roller journal of the third roller, or vice versa.

4. The roller arrangement according to claim 1, wherein at least three bearings are arranged axially adjacent to each other at least on a first roller journal of the first roller and the adjacent first roller journal of the second roller,
   wherein a compressive stress is generated between, on the one hand, an inner bearing and an outer bearing on the first roller journal of the first roller and, on the other hand, a central bearing unit on the first roller journal of the second roller, and a tensile stress is generated between, on the one hand, a central bearing unit on the first roller journal of the first roller and, on the other hand, an inner bearing and an outer bearing on the first roller journal of the second roller, or vice versa.

5. The roller arrangement according to claim 4, wherein at least three bearings are arranged axially adjacent to one another at least on the first roller journal of the third roller, wherein a compressive stress is generated between, on the one hand, an inner bearing and an outer bearing on the first roller journal of the second roller and, on the other hand, a central bearing unit on the first roller journal of the third roller, and a tensile stress is generated between, on the one hand, a central bearing unit on the first roller journal of the second roller and, on the other hand, an inner bearing and an outer bearing on the first roller journal of the third roller, or vice versa.

6. The roller arrangement according to claim 4, wherein at least three bearings are arranged at least on both of the second roller journal of the first roller and on the adjacent second roller journal of the second roller,
   wherein a compressive stress is generated mirror inverted to the opposite first roller journal side between, on the one hand, an inner bearing and an outer bearing on the second roller journal of the first roller and, on the other hand, a central bearing unit on the second roller journal of the second roller, and a tensile stress is generated between, on the one hand, a central bearing unit on the second roller journal of the first roller and, on the other hand, an inner bearing and an outer bearing on the second roller journal of the second roller, or vice versa.

7. The roller arrangement according to claim 4, wherein at least three bearings are arranged at least on the second roller journal of the third roller, wherein a compressive stress is generated mirror inverted to the opposite first roller journal side between, on the one hand, an inner bearing and an outer bearing on the second roller journal of the second roller and, on the other hand, a middle bearing unit on the second roller journal of the third roller, and a tensile stress is generated between, on the one hand, a central bearing unit on the second roller journal of the second roller and, on the other hand, an inner bearing and an outer bearing on the second roller journal of the third roller, or vice versa.

8. The roller arrangement according to claim 4, wherein each of the central bearing units comprises one or more bearings.

9. The roller arrangement according to claim 1, wherein for generating the tensile and/or compressive stresses a respective roller bearing control unit is arranged between the roller journals, via which the respective nip adjustments are realized.

10. The roller arrangement according to claim 9, wherein each of the respective roller bearing control units comprises a pressure-controlled actuator.

11. The roller arrangement according to claim 10, wherein the actuator comprises a hydraulic, mechanical, or electrical actuator.

12. The roller arrangement according to claim 9, wherein each of the bearings comprises an inner ring and an outer ring and each of the respective roller bearing control units is in operative connection with each of the outer rings of the bearings.

13. The roller arrangement according to claim 1, wherein each of the bearings comprises a rolling bearing and/or a plain bearing.

14. The roller arrangement according to claim 1, wherein a material to be rolled is passed through the nips alternately in opposite directions from nip to nip.

* * * * *